US012741366B2

(12) United States Patent
Wahrburg et al.

(10) Patent No.: US 12,741,366 B2
(45) Date of Patent: Sep. 22, 2026

(54) ROBOT SYSTEM FOR LEAD-THROUGH PROGRAMMING

(71) Applicant: ABB Schweiz AG, Baden (CH)

(72) Inventors: Arne Wahrburg, Weiterstadt (DE); Richard Roberts, Gilching (DE); Tomas Groth, Västeras (SE)

(73) Assignee: ABB Schweiz AG, Baden (CH)

(*) Notice: Subject to any disclaimer, the term of this patent is extended or adjusted under 35 U.S.C. 154(b) by 54 days.

(21) Appl. No.: 18/814,931

(22) Filed: Aug. 26, 2024

(65) Prior Publication Data

US 2024/0416503 A1 Dec. 19, 2024

Related U.S. Application Data

(63) Continuation of application No. PCT/EP2022/054888, filed on Feb. 25, 2022.

(51) Int. Cl.
*B25J 9/00* (2006.01)
*B25J 13/00* (2006.01)

(52) U.S. Cl.
CPC ............ *B25J 9/0081* (2013.01); *B25J 13/00* (2013.01)

(58) Field of Classification Search
CPC ........ B25J 9/0081; B25J 13/00; B25J 9/1633; G05B 2219/35472; G05B 2219/39338; G05B 2219/39339; G05B 2219/39427; G05B 19/423
USPC ........................................................ 700/264
See application file for complete search history.

(56) References Cited

U.S. PATENT DOCUMENTS

2015/0352720 A1* 12/2015 Iizuka .................... B25J 9/1664 414/730
2019/0047153 A1* 2/2019 Mönnich ................ B25J 9/1633
2019/0168383 A1* 6/2019 Haddadin ................ B25J 9/163
2023/0200922 A1* 6/2023 Huang ................... A61B 34/30
2024/0009858 A1* 1/2024 Inoue ..................... B25J 13/085
2024/0383141 A1* 11/2024 Ferraguti ............... B25J 13/085

FOREIGN PATENT DOCUMENTS

EP 2299344 B1 10/2013

OTHER PUBLICATIONS

European Patent Office, International Search Report in International Patent Application No. PCT/EP2022/054888, 6 pp. (Dec. 1, 2022).
European Patent Office, Written Opinion in International Patent Application No. PCT/EP2022/054888, 9 pp. (Dec. 1, 2022).

* cited by examiner

*Primary Examiner* — Kira Nguyen
(74) *Attorney, Agent, or Firm* — Whitmyer IP Group LLC

(57) ABSTRACT

A robot system comprises a manipulator and a controller therefore, wherein the controller supports impedance-based control of a lead-through operation mode, characterized in that the controller is switchable between impedance-based and admittance-based control of the lead-through mode.

20 Claims, 1 Drawing Sheet

1
4
3
13
11
10
9
12
3'
4
2
7
8
4
5
6

$x_{act}$
14
16
17
1
$\tau_{arm,ref}$
10,11
21
$\xi$
$\tau_{arm}$
$\tau_{ref}$
15
22
18
$\dot{q}_{ref}$
$\xi$
20
19
$f_{act}$
$\dot{q}_{mot}$

ROBOT SYSTEM FOR LEAD-THROUGH PROGRAMMING

CROSS-REFERENCE TO RELATED APPLICATIONS

The instant application claims priority to International Patent Application No. PCT/EP2022/054888, filed Feb. 25, 2022, which is incorporated herein in its entirety by reference.

FIELD OF THE DISCLOSURE

The present disclosure generally relates to a robot system that is adapted to learn a movement by being led through it by a user.

BACKGROUND OF THE INVENTION

Lead-through is a convenient and efficient way to teach a robot a movement that the robot is meant to reproduce. In lead-through mode, when a user seizes a movable portion of the robot manipulator and displaces it, the associated controller will record the coordinates or poses the manipulator passes through, in order to move it along these when the movement is reproduced later in production mode.

A difficulty to be overcome when implementing a lead-through mode is that joints of the manipulator must not become limp, but must maintain sufficient "tonus" to retain its pose while not being manipulated by the user. On the other hand, the manipulator should easily yield to a force applied by the user. The first requirement can be satisfied by the controller calculating, based on joint coordinates of the manipulator, the gravity-induced torque acting on each joint of the manipulator, and controlling the motor associated to each joint to generate the precise amount of torque required to compensate the gravity-induced torque.

To displace the manipulator, the user must overcome internal friction of the manipulator, which, in case of a large industrial robot, may be physically challenging. It is therefore necessary to implement some kind of servo mechanism that will detect the user urging the manipulator into a certain direction and will control the motors to move it that way, overcoming the internal friction.

One way to do so is referred to in the art as admittance-based control. Here, the controller detects a vector force applied by the user to the movable portion and controls the manipulator so that the movable portion moves in the direction of the force and at a speed that is dependent on the amount of the force. With this approach, the user must apply a non-vanishing force all the way until the movable portion reaches its target location, so that physical exertion can at best be reduced, but not avoided. Further, the fact that, similar to when moving a spoon through a viscous liquid, the force the user must overcome tends to be the stronger, the faster the movable portion is moved, makes swift movements in lead-through difficult.

This is why robot systems generally use impedance-based control for lead-through. In impedance-based control, what is detected is a deviation between a reference position and an actual position of the mobile portion. When the reference position is lagging behind the actual position, and user is moving the mobile portion at a constant speed, the lag will tend to adjust so that the controller ends up driving the mobile portion with just the speed intended by the user. The resistance felt by the user can be set close to zero, so that fast and far-flung movements can be taught without effort.

Impedance-based control has its limitations, however, when it comes to precise positioning. When the user attempts to displace the mobile portion by a small distance, the deviation between reference position and an actual position is small, too, and motor torque applied by the controller in support of the intended displacement may initially be too small to overcome static friction of the manipulator. Once it has become large enough to overcome static friction, the manipulator is likely to jerk, ending up at a position beyond the one intended by the user.

Conventionally, this problem has been worked around by using lead-through only for movements or parts of movements where precision isn't critical, and to use jogging control, by some input means external to the manipulator, for fine positioning. Jogging control tends to be time-consuming, since the user cannot tell a priori how a jogging step input to the external input means will translate into movement of the manipulator.

Approaches which attempt to overcome this problem by, for example, defining jogging motion in application coordinates still suffer from the limitation that these coordinates must first be precisely matched to the real world. The user must also split his attention between the manipulator and the input device, which makes the process less intuitive.

BRIEF SUMMARY OF THE INVENTION

The present disclosure generally describes a robot system that can be taught in lead-through mode, not only quickly and without effort, but also with high precision, and a control method for such a robot system. In one embodiment, a robot system includes a manipulator and a controller therefore, wherein the controller supports impedance-based control of a lead-through operation mode, the controller being switchable between impedance-based and admittance-based control of the lead-through mode. Thus, impedance-based control can be used for teaching the system a long-haul part of a movement, not precisely up to a target position, but to somewhere close, and the final short-haul part in which the target position must be reached precisely can be done under admittance control.

For the final part, it isn't critical that under admittance control the manipulator will always show a certain resistance to displacement, on the one hand because the distance of the displacement is short, on the other because where precise positioning is required, the user will displace the manipulator slowly, and the slower the displacement is, the smaller the resistance tends to be.

BRIEF DESCRIPTION OF THE SEVERAL VIEWS OF THE DRAWING(S)

DETAILED DESCRIPTION OF THE INVENTION

Figure 1:
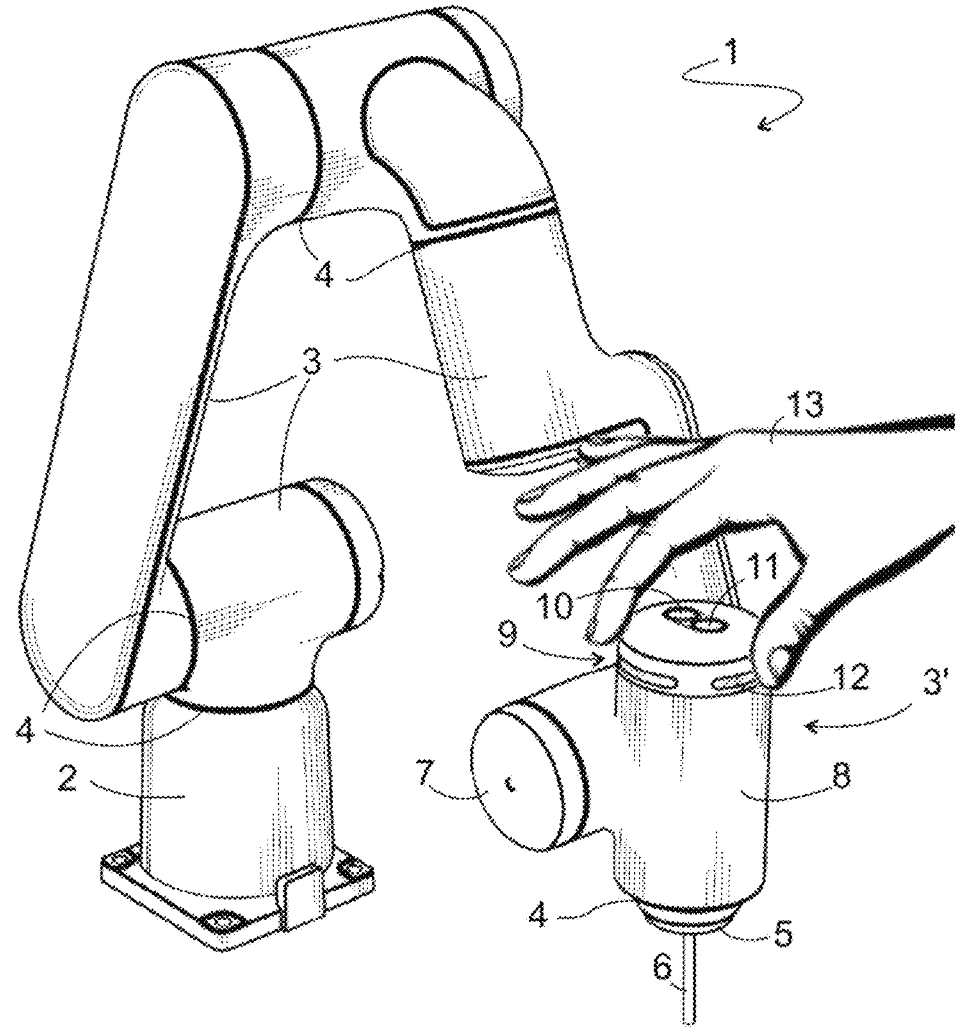
FIG. 1 is a perspective view of a manipulator being guided in lead-through mode in accordance with the disclosure.

FIG. 1 is a perspective view of a manipulator 1 for use in a robot system according to the disclosure. The manipulator 1 has a stationary base 2 that may be mounted to a tabletop or some other appropriate support, not shown, and a plurality of links 3 in various shapes rotatably connected to each other and to the base 2 by joints 4. Another rotatable joint is provided between the most distal link 3' and a mounting interface 5 to which an end effector 6, schematically represented as a rod in FIG. 1, can be replaceably mounted.

The most distal link 3', also referred to as the wrist of the manipulator 1, can have any shape fit to be seized by a user's hand. In the example shown, it is formed of two cylinders 7, 8 that are arranged at right angles with respect to each other and overlap partially. Each cylinder 7, 8 accommodates an electric motor for driving rotation of the joint 4 next to it.

At an end of the distal cylinder 8 opposite to the mounting interface 5, a user interface 9 is provided. The user interface 9 comprises switches 10, 11 and a luminous indicator 12. The user interface 9 is in the shape of a disk with a diameter allowing the disk to be seized by fingers of a user's hand 13 simultaneously touching points on opposite sides of the periphery of the disk. The switches 10, 11 are located in the center of the disk, so as to be operable by one finger of the hand 13 while the others are holding the disk.

In the embodiment shown, one of the switches 10, 11 can serve to switch over the manipulator 1 between a lead-through mode and a production mode in which the manipulator 1 reproduces movements previously taught to it in the lead-through mode, and the other allows to switch over between impedance-based control and admittance-based control of the lead-through mode. Alternatively, a single switch might be used for both switchovers, e.g. by a single pressing of the switch causing the switchover between production and lead-through mode and a double pressing causing, in lead-through mode, a switchover between impedance-based control and admittance-based control. One might also consider to have the manipulator operate in one control mode while the associated switch is pressed, and in the other when the switch is released. Since most of the time spent in lead-through mode is likely to be under impedance-based control, it can be practical to have the manipulator 1 operate under admittance-based control only while there is a user's finger on the switch.

Alternatively, switches or contact sensors might be located on the periphery of the disk, e.g. for distinguishing whether there are individual fingers placed on the periphery as shown in FIG. 1, or whether the user's hand wraps around the periphery. The former being appropriate for fine positioning, admittance-based control may be chosen in such a case, whereas a hand wrapped around the periphery of user interface 9 gives reason to expect that the user is planning to move the manipulator fast and far, so that impedance-based control would be adequate.

A switch for setting the type of control might also comprise pressure sensors on opposite sides of the user interface. Such pressure sensors can be designed to distinguish between a firm grab by a user intending to move the manipulator fast and far, and a delicate touch for fine positioning. In the first case, impedance-based control could be set, and in the latter, admittance-based control.

Other ways for determining the mode of operation of the manipulator 1 can be provided, in addition or as an alternative to switches 9, 10. For example, switches similar in function to switches 9, 10 can be provided remotely from manipulator 1, e.g. for operation by the user's other hand. Or a speech recognition system may be adapted to set the operation mode according to a spoken instruction from the user.

Other schemes to determine the type of control do not require a dedicated switch or sensor at all. Conventionally, all joints of the manipulator have torque sensors 20 associated to them which in production mode allow to judge whether the manipulator has collided with an obstacle and which in lead-through mode allow to detect the amount and direction of a force applied by the user. When the user starts to move the manipulator and finds it to resist the displacement, he may intuitively try to shake or break it loose.

Such resistance will be felt when the manipulator is under admittance based control. A controller may therefore interpret an abrupt, strong increase of the force applied by the user or a sudden change of direction of the force as indicative of the user's wish to move the manipulator freely, and therefore switch from admittance-based control to impedance-based control.

On the other hand, when the user has been moving the manipulator under impedance-based control and is approaching a target position, he will first slow down the movement, and then experience the stick-slip effect associated with impedance-based control: when the controller of the manipulator 1 detects that the user has displaced the manipulator slightly from a reference position, it will apply a small torque which initially may be insufficient to overcome static friction in the manipulator. When the torque finally becomes large enough to overcome static friction, be it due to an integrative effect in the controller or due to the user urging the manipulator farther and farther in order to get a reaction from the controller, the new reference position where the manipulator comes to rest again is likely to be beyond the target position. In order to correct, the user will urge the manipulator in the opposite direction. Therefore, when under impedance-based control the controller can be adapted to detect a decrease of speed of the manipulator followed by a change of direction, or repeated changes of direction, and to respond thereto by switching over to admittance-based control.

Another approach for deciding the appropriate control mode can be based on the fact that while seizing the manipulator by the wrist 3' may be the user's intuitive choice when having to lead it far and fast, fine positioning is easier when the manipulator I can be seized close to a reference point of the end effector which, for carrying out an operation on a workpiece, must be placed correctly close to the workpiece. Therefore, the control mode under which the manipulator operates can be set depending on where the user touches the manipulator. Specifically, when the user seizes the manipulator 1 by the wrist 3', the force applied by him is detected by torque sensors 20 of all joints 4 on the proximal side of the wrist 3', but not by a torque sensor of the joint 4 between the wrist 3' and the end effector 6, whereas, when he seizes the end effector 6, the force will also be detected at this latter sensor.

So the controller may be adapted to carry out impedance-based control when the manipulator is guided by the wrist 3', and admittance based control when it is guided by the end effector 6. The luminous indicator 12 is for feeding back to the user that a controller of the manipulator 1 has received and taken account of an input, e.g. by shining in a first color in production mode, in a second color in lead-through mode under impedance-based control and in a third color in lead-through mode under admittance-based control, or by varying flashing frequencies or patterns depending on the mode the robot system is in.

Figure 2:
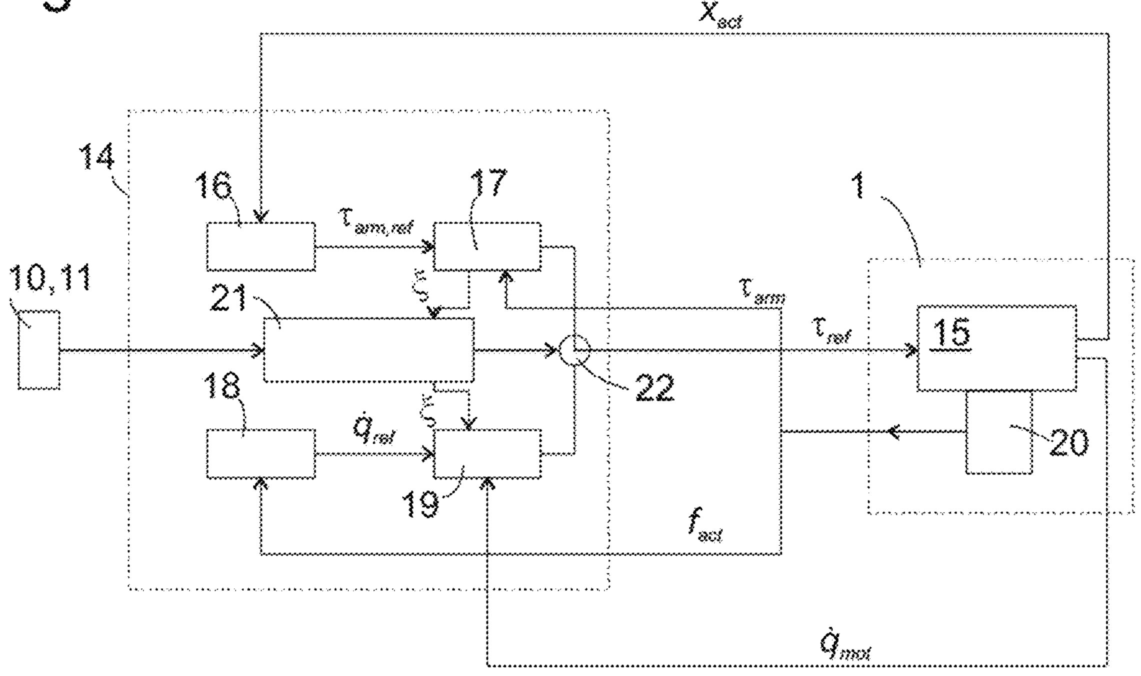
FIG. 2 is a block diagram of a robot system in accordance with the disclosure.

FIG. 2 is a block diagram of a robot system in accordance with the disclosure. Controller 14 controls manipulator 1 by iteratively calculating, for each motor 15 of the manipulator 1, a torque $\tau_{ref}$ to be generated by it. A logic unit 21 determines the type of control to be applied when determining $\tau_{ref}$ based on input from switches 10, 11 or by evaluating external forces applied to manipulator 1 as described above. Feedback from the manipulator 1 to the controller 14 can be in the form of rotation angles of the joints 4, from which an actual position $x_{act}$ of a reference point of the wrist 3' or its end effector 6 can be calculated, and/or in the form of rotation speeds $\dot{q}$mot of the motors 15, which can be converted into rotation angles or the actual position when initial angles are known for all joints 4.

While the manipulator 1 is at rest, $\tau_{ref}$ is calculated for each joint 4 so that it compensates gravity-induced torque in that joint. To this effect, the controller 14 can store a model of the manipulator 1 that enables it to calculate, from the angles of the joints 4, the positions of centers of gravity of all links 3 on the distal side of a given joint, and the torque thus generated in that joint.

Impedance-based control is implemented by nested PD control loops 16, 17. Outer control loop 16 receives from manipulator 1 the actual position 10 $x_{act}$ of the reference point (or other data from which the actual position can be calculated) and determines a difference between it and a reference position.

While the manipulator 1 is at rest and not subject to a force from the user, this difference is zero, and so will be torque command $\tau_{arm,ref}$ output to inner control loop 17. When the user pushes the manipulator 1 so that the reference point becomes displaced with respect to the reference position by a nonzero displacement d, outer control loop 16 converts the displacement d into a virtual force in the direction of d which is a sum of a term proportional to d and a term proportional to $\dot{d}$, and maps the virtual force into joint space, i.e. calculates for each joint the torque $\tau_{arm,ref}$ which must be generated by the motor 15 associated to that joint in order to apply the virtual force to the reference point.

The inner and outer control loops 16, 17 operate in cycles. When k is the number of the present cycle, control loop 17 obtains $$\tau_{ref}^{k}$$

by calculating $$\tau_{ref}^{k} = \tau_{arm,ref}^{k} + K_P(\tau_{arm,ref}^{k} - \tau_a^{k}) - K_D\zeta^{k}, \tag{1}$$

wherein $K_P$, $K_D$ are gain coefficients, and $\zeta^k$ is and internal filter state of control loop 17, depending on previous in- and outputs according to $$\zeta^{k} = \frac{2T_f - T_s}{2T_f + T_s}\zeta^{k-1} + \frac{2}{2T_f + T_s}(\tau_{arm}^{k} - \tau_{arm}^{k-1}) \tag{2}$$

$T_f$ is a filter time constant of control loop 17, $T_s$ is its sampling time constant.

Let us assume that in preceding cycle k-1 inner loop 17 has received $$\tau_{arm,ref}^{k-1}$$

as a set value and has calculated from it the torque command $$\tau_{ref}^{k-1}$$

and has sent it to the motor 15. Let us further assume that before the next cycle k begins, a user input as described above causes the controller 14 to switch over to admittance-based control.

Admittance-based control is implemented by nested PD and PI control loops 18, 19. Outer loop 18 receives from manipulator 1 an actual contact force $f_{act}$ applied to the reference point by the user (or other data from which the actual force can be calculated). Contact forces can either be measured using a force/torque sensor mounted in the wrist 3' or calculated using joint torque sensing in the joints 4 of the manipulator 1 and a dynamic manipulator model. The outer control loop 18 maps the contact force fact into joint space, i.e. derives from it reference speeds $\dot{q}_{ref}$ for each joint.

Inner control loop 19 receives the reference speed $\dot{q}_{ref}$ for its associated motor as a set value, and issues a torque command $\tau_{ref}$ based on the current speed $\dot{q}_{mot}$ motor 15.

The operation of inner control loop 19 is governed by equations $$\xi^{k} = \xi^{k-1} + T_s(\dot{q}_{ref}^{k} - \dot{q}^{k}) \tag{3}$$

$$\tau_{ref}^{k} = K_v(\dot{q}_{ref}^{k} - \dot{q}^{k}) + K\xi^{k} \tag{4}$$

wherein $\xi^k$, $\xi^{k-1}$ denote the value of an internal filter state parameter in cycle k and preceding cycle k−1, and $K_i$, $K_v$, are controller gain coefficients. In order to avoid a jerk at switchover, we require that the torque command $$\tau_{ref}^{k}$$

issued by control loop 19 in cycle k, immediately after switchover from impedance-based control to admittance-based control, shall be equal to the torque command $$\tau_{ref}^{k-1}$$

issued by control loop 17 in cycle k−1. This requirement is satisfied by initializing the internal filter state of control loop 19 by $$\xi^{k} := \frac{\tau_{ref}^{k-1} - K_v(\dot{q}_{ref}^{k} - \dot{q}^{k})}{K_i} \tag{5}$$

When the controller 14 resumes impedance-based control, a jerk-free transition can be ensured in a similar way. Let us again assume that cycle k−1 is the last cycle under admittance-based control and cycle k is the first under impedance-based control. Again, the requirement for a smooth transition is $$\tau_{ref}^{k} = \tau_{ref}^{k-1}.$$

Based on eq. (1) we obtain $$\tau_{arm,ref}^{k} + K_P(\tau_{arm,ref}^{k} - \tau_a^{k}) - K_D\zeta^{k} = \tau_{ref}^{k-1}$$

Resolving for $\zeta^k$ and making use of eq. (2), we find $$\zeta^{k-1} := \frac{2T_f + T_s}{K_D(2T_f - T_s)}\left(\tau_{a,ref}^k + K_P\left(\tau_{a,ref}^k - \tau_a^k\right) - \tau_{mot}^{k-1}\right) - \frac{2}{2T_f - T_s}\left(\tau_a^k - \tau_a^{k-1}\right)$$

When control loop 17 is initialized with this value before switching over, a smooth transition to impedance-based control is ensured.

While FIG. 2 might suggest that control loops 16, 17 and 18, 19 are implemented in hardware and coexist in controller 14, a switch 22 controlled by logic unit 21 determining which control loop 17 or 19 actually outputs to the motor 15, it should be noted that this is for illustrative purposes only, and that e.g. a single microprocessor, controlled by appropriate software, may implement each of these control loops at different times.

In the embodiments described herein, the system can comprise a user-operated switch for switching between impedance-based control and admittance-based control of the lead-through mode.

In most practical embodiments the switch will be hand-operated, but voice or gesture control is also conceivable.

For convenient handling, the hand-operated switch can be provided in a movable portion of the manipulator, ideally close to the end-effector, i.e. there should not be more than one joint between it and the end effector.

Where the manipulator has a handle portion to be held in the hand of a user guiding the manipulator in lead-through mode, the switch can be located in, or adjacent to, the handle portion, so as to be operable by the hand holding the handle portion.

The same switch can also be used for switching between lead-through and production modes of the robot system, e.g. single operation of the switch within a given time interval may cause a switchover between lead-through and production modes, whereas in lead-through mode double operation of the switch causes a switchover between impedance-based control and admittance-based control.

When the manipulator has a handle portion as defined above, the switch can also be a sensor which is sensitive to the way in which the handle portion is touched. For example, a pressure sensor can be sensitive to the firmness with which the handle portion is held, e.g. by detecting pressure applied to opposite sides of the handle portion. When the user's hand presses from opposite sides, or the pressure exceeds a given threshold, it is likely that the user expects to decelerate the handle portion after having moved it, suggesting that he intends a long-range movement that should best be carried out under impedance-based control, whereas slight pressure or the handle portion being nudged from one side only suggests that the user intends to do fine positioning, which should be carried out under admittance-based control.

The switch can be dispensed with if the controller is adapted to scan the user's input into the handle portion for a predetermined pattern and to switch from one of between impedance-based control and admittance based control to the other when the pattern is detected in the input.

Such a pattern can be an abrupt change of direction of the input. Thus, at the beginning of a movement, the user might "shake loose" the manipulator in order to make it easily displaceable under impedance-based control. On the other hand, a change of direction preceded by a continuous decrease of speed is likely to occur when the user, is trying to reach a predetermined target position at the end of a long movement. In that case fine positioning can facilitated by switching automatically into admittance-based control.

An indicator should be provided by which the user can tell at any time under which type of control the manipulator is. The controller controls a movement of the manipulator by transmitting successive values of a reference parameter to a motor of the manipulator. Typically, the reference parameter specifies a torque to be output by the motor.

As a rule, these values will differ depending on whether the manipulator is under impedance control or admittance control. Therefore, care should be taken to avoid an abrupt change in the reference parameter values sent to the motor that might cause the manipulator to jerk in the event of a switchover.

Where the controller comprises a first control loop for sequentially outputting reference parameter values in a first one of impedance control and admittance control, and a second control loop for sequentially outputting reference parameter values in the other one of impedance control and admittance control, in the event of switching from the first one to the other one of impedance-based control and admittance-based control, the second control loop should therefore be initialized to output, as a reference parameter value of a first iteration after switching, a value that differs by not more than a predetermined amount from the value output by the first control loop in a last iteration before switching. In the simplest case, the initialization may cause the reference parameter value of the first iteration after switching to be identical to that of the last iteration before switching.

A method for controlling a robot system in lead-through mode is also described herein, the robot system having a manipulator and a controller, in which a user guides a movement of a mobile portion of the manipulator to a target position, the method comprising the steps of a) the controller supporting an initial phase of the movement under impedance control, and b) the controller supporting a final phase of the movement under admittance control.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Reference Numerals

1 manipulator
2 base
3 link
4 joint
5 mounting interface
6 end effector
7 cylinder
8 cylinder
9 user interface
10 switch
11 switch
12 luminous indicator
13 hand
14 controller
15 motor
16 outer control loop
17 inner control loop
18 outer control loop
19 inner control loop
20 torque sensor
21 logic unit
22 switch

What is claimed is:

1. A robot system comprising a manipulator and a controller associated with the manipulator, wherein the controller supports impedance based control of a lead-through operation mode, wherein the controller is switchable between impedance based and admittance-based control of the lead-through mode, wherein the impedance based control is used for teaching the robot system a long-haul part of a movement of the manipulator so as to be in general proximately to a target position, and wherein a final short-haul part of the movement in which the target position must be reached more precisely is accomplished under admittance based control.

2. The robot system of claim 1, further comprising a hand-operated switch for switching between impedance-based control and admittance-based control of the lead-through mode.

3. The robot system of claim 2, wherein the switch is provided in a movable portion of the manipulator.

4. The robot system of claim 3, wherein the manipulator has a handle portion to be held in the hand of a user guiding the manipulator in lead-through mode, and the switch is located in or adjacent to the handle portion so as to be operable by the hand holding the handle portion.

5. The robot system of claim 4, wherein the switch is a sensor which is sensitive to the way in which the handle portion is touched.

6. The robot system of claim 1, wherein the manipulator has a handle portion to be held in a hand of a user guiding the manipulator in lead-through mode, and the controller is adapted to scan the user's input into the handle portion for a predetermined pattern and to switch from one of impedance-based control and admittance-based control to the other when the pattern is detected in the input.

7. The robot system of claim 6, wherein the pattern is an abrupt change of direction of the input.

8. The robot system of claim 7, wherein the pattern causes the controller to switch from admittance-based control to impedance-based control.

9. The robot system of claim 6, wherein the pattern is a change of direction of the input preceded by a continuous decrease of speed.

10. The robot system of claim 9, wherein the pattern causes the controller to switch from impedance-based control to admittance-based control.

11. The robot system of claim 1, wherein the manipulator carries an indicator for indicating a current mode of control of the lead-through mode.

12. A robot system comprising a manipulator and a controller associated with the manipulator, wherein the controller supports impedance based control of a lead-through operation mode, wherein the controller is switchable between impedance based and admittance-based control of the lead-through mode;

wherein a motor of the manipulator is adapted to receive a reference parameter from the controller, and the controller comprises a first control loop for sequentially outputting reference parameter values in a first one of impedance control and admittance control, and a second control loop for sequentially outputting reference parameter values in the other one of impedance control and admittance control, wherein, when switching from the first one to the other one of impedance-based control and admittance-based control, the second control loop is initialized to output, as a reference parameter value of a first iteration after switching, a value that differs by not more than a predetermined amount from the value output by the first control loop in a last iteration before switching.

13. The robot system of claim 12, further comprising a hand-operated switch for switching between impedance-based control and admittance-based control of the lead-through mode.

14. The robot system of claim 12, wherein the switch is provided in a movable portion of the manipulator.

15. The robot system of claim 14, wherein the manipulator has a handle portion to be held in the hand of a user guiding the manipulator in lead-through mode, and the switch is located in or adjacent to the handle portion so as to be operable by the hand holding the handle portion.

16. The robot system of claim 12, wherein the manipulator has a handle portion to be held in a hand of a user guiding the manipulator in lead-through mode, and the controller is adapted to scan the user's input into the handle portion for a predetermined pattern and to switch from one of impedance-based control and admittance-based control to the other when the pattern is detected in the input.

17. The robot system of claim 16, wherein the pattern is an abrupt change of direction of the input.

18. The robot system of claim 17, wherein the pattern causes the controller to switch from admittance-based control to impedance-based control.

19. The robot system of claim 16, wherein the pattern is a change of direction of the input preceded by a continuous decrease of speed.

20. A method for controlling a robot system in lead-through mode, the robot system having a manipulator and a controller, in which method a user guides a movement of a mobile portion of the manipulator to a target position, comprising:

a) the controller supporting an initial phase of the movement under impedance control, and b) the controller supporting a final phase of the movement under admittance control, wherein the impedance control is used for teaching the robot system a long-haul part of a movement of the manipulator so as to be in general proximately to a target position, and wherein a final short-haul part of the movement in which the target position must be reached more precisely is accomplished under admittance control.

* * * * *